United States Patent [19]

Warnar et al.

[11] Patent Number: 5,444,559
[45] Date of Patent: Aug. 22, 1995

[54] METHOD AND APPARATUS FOR CONTROLLING OPTICAL CHARACTERISTICS OF A PROGRAMMABLE SURFACE MEDIUM

[76] Inventors: Robert B. J. Warnar, 11305 Wacomor Dr., Germantown, Md. 20876; Gerald S. Lang, 812 Downs Dr., Silver Spring, Md. 20904

[21] Appl. No.: 37,445

[22] Filed: Mar. 26, 1993

[51] Int. Cl.⁶ .................................... G02F 1/13
[52] U.S. Cl. ........................... 359/85; 359/72
[58] Field of Search ............ 359/85, 72, 84, 55, 359/47, 36

[56] References Cited

U.S. PATENT DOCUMENTS

| | | | |
|---|---|---|---|
| 4,300,818 | 11/1981 | Schachar | 359/84 |
| 4,456,335 | 6/1984 | Mumford | 351/62 |
| 4,462,661 | 7/1984 | Witt | 359/40 |
| 4,482,326 | 11/1984 | Witt | 359/84 |
| 4,560,239 | 12/1985 | Katz | 359/85 |
| 4,601,545 | 7/1986 | Kern | 359/46 |
| 4,620,322 | 11/1986 | Eggenschwiler et al. | 359/66 |
| 4,678,281 | 7/1987 | Bauer | 351/38 |
| 4,756,605 | 7/1988 | Okada et al. | 359/83 |
| 4,759,608 | 7/1988 | Yang | 359/66 |
| 4,763,993 | 8/1988 | Vogeley | 359/85 |
| 4,842,400 | 6/1989 | Klein | 359/58 |
| 4,848,875 | 6/1989 | Baughman et al. | 359/52 |
| 4,848,890 | 7/1989 | Horn | 359/44 |
| 4,893,902 | 1/1990 | Baughman et al. | 359/83 |
| 4,917,735 | 7/1990 | Moddel et al. | 359/56 |
| 4,968,127 | 11/1990 | Russell et al. | 359/44 |
| 5,172,256 | 12/1992 | Sethofer | 359/85 |

Primary Examiner—Eugene R. LaRoche
Assistant Examiner—A. Zarabian
Attorney, Agent, or Firm—Hoffman, Wasson & Gitler

[57] ABSTRACT

An electromagnetic radiation control device is proposed using visually transparent computers and associated components to control the device's optical memory and the characteristics of its active optical component all contained within a capsule. The invention can be applied to items such as eyeglasses, contact lenses, window panes, doors, building panels, mirrors, billboards, light shields, electronic displays (TV, etc), reducers, magnifiers, projection systems, sunlight reflectors, cameras and other lenses, portable transponders for the blind, optical prothesis, and any combination of the above.

9 Claims, 11 Drawing Sheets

METHOD AND APPARATUS FOR CONTROLLING OPTICAL CHARACTERISTICS OF A PROGRAMMABLE SURFACE MEDIUM

BACKGROUND OF THE INVENTION

1. Field of the Invention

The invention relates to an electromagnetic radiation control device hereafter specifically designated as the Programmable Optical Composite Surface (POCS) system, which functions as a solid-state, electronically controlled display, on-line and off-line storage display system and scanner, and light regulator.

2. Prior Art

Methods and apparatus for controlling optical characteristics of a transparent medium have been disclosed. U.S. Pat. Nos. 4,601,545, 4,678,281, and 5,025,602 can be used as examples of methods and apparatus for controlling transparent liquid crystal-like optical windows. In these patents, methods and apparatus use a liquid crystal element as the active optical agent. U.S. Pat. No. 4,601,545 discloses a system comprising a variable power lens having a thin film of an optically active molecular agent for producing a variable gradient index of refraction within its apparatus. The invention may also be applied to a self-powered variable lens that is either curved or flat. Large and miniature embodiments are proposed.

U.S. Pat. No. 4,678,281 proposes a method and apparatus with detailed circuitry for controlling many of the optical characteristics using ideas as described in U.S. Pat. Nos. 3,982,239, 4,016,094, and 4,050,814. U.S. Pat. Nos. 3,499,112, 4,016,094, 4,019,807, 4,222,641, and 4,601,545 disclose numerous methods for controlling light transmissivity and color in liquid crystal devices.

Particularly U.S. Pat. No. 4,601,545 attempts to address variable cylinder power and axis, prism power and axis, light and color addition to a sphere by use of integrated components such as a microprocessor. However, no system is found in prior art that exhibits inherent optically controllable memory, is totally transparent, uses a hierarchy of networked computers needed as distributed intelligence for controlling varying conditions in various geographical locations in the composite surfaces, provides optical communications among its internal computers and with an "outside" master computer, and cryptographics for protecting the security and integrity of its communication and memory system.

SUMMARY OF THE INVENTION

The term "optical window" as presented herein, refers to a device that is visually transparent to the naked eye, nearly transparent, reflective, nearly reflective, dark, or any combination of these and exhibits long and short-time memory. In its present form, the invention relates to a monolithic POCS system that is programmable, self-controlled, self-powered, self-cooled, and reacts with its environment as dictated by programs residing in memory within its network of computers.

The term "active optical agent" as presented herein, refers to a quantity of liquid material placed between transparent plates each of which carries a number of separate programmable electrodes. The electrodes provide the necessary electrical stimulus to the active optical agent to reliably obtain the desired optical effects from the POCS system. The proposed system incorporates an active optical agent, such as a liquid crystal, to vary its light transmissivity or reflectivity (like a mirror), and a number of Very Large Scale Integration (VLSI) circuits for controlling its optical characteristics including color and image storage.

The term VLSI refers to deposited circuitry that may contain several thousand electronic gates per given function where a gate may contain several dozen basic components, such as diodes, transistors, and passive components like resistors, inductors, and capacitors. VLSI circuitry, using either Thin Film Transistor (TFT) or other solid-state deposition techniques, is transparent, visually redundant, and is deposited on any surface area within a hermetically closed capsule. The transparency feature is obtained by depositing very thin layers of substrates onto a transparent medium. The substrate is the basic building block upon which the VLSI circuitry is fabricated and its fabrication is well-known to those skilled in the art. Examples within this document use VLSI deposited on two inside surfaces, front and rear surfaces, or on thin layered substrates within the window capsule.

The system incorporates a network of computers. The term computer, when referenced in this document, identifies a solid-state device that is programmable, has a stored program, has input/output paths, has memory (both nonvolatile and volatile), has processing power, and together with any connections to any other components, is completely transparent to the naked eye. The computers, interconnected by electromagnetic, electrical, or other means, are light powered using light energy converters and sensors such as solar cells. The converted energy is supplied to the computers'regulators and storage cells which in turn supply and regulate all the power necessary for each computer's domain circuitry and network facilities.

A computer domain within the system is the geographical area for which one computer is mainly responsible. Information about the optical images, sensed on either the front or rear surface of the optical window, is sensed by optical sensors, converted to digital data, compressed and stored in the computer's memory system. The digital optical information can be retrieved for transmission and can therefore be displayed locally or at other locations depending on the application. Domain computers communicate with each other in an optical manner or electrically, for example, via thin film buses. Hence, conditions in one set of domains may influence operations in other domains depending on the application and instructions stored within the programs in the computers.

The invention incorporates a "master computer" that programs a given application in the system such as mirror, magnify, TV, clear, dark, color, other, or any combinations thereof. The systems' computers are "named" and communicate with the master computer via a clear or encrypted optical link for exchanging information. In this manner, the system may be updated, for example, to change reaction with its environment or to change its application. The master computer may run tests on the system to verify operation of all the domains. In addition, the master computer can send and receive clear or encrypted data and instructions, or a combination of both, received via LAN, WAN, or other such outside networks to the system.

The system can operate solely by light energy, or energy such as chemical, radioactive, electrostatic, electromagnetic, thermocouple, and piezoelectric. Using any of these power modes, the hermetically enclosed system may have to dissipate unused energy in the form of heat. The patented systems within this field ignore the influences of undissipated heat. Uncontrolled heat will cause loss of control over the optical characteristics of active optical agent devices and could eventually cause their destruction. This invention can be cooled using a number of methods. One method introduces a precooling agent, such as a cooled gas, in the front part of the system. Another method moves either the active optical component or a separate cooling agent, under the control or advice of the domain computers, through a set of microtubes within the system to a cooling area. After cooling, the agent is pumped back through the system.

BRIEF DESCRIPTION OF THE DRAWINGS

The invention is clarified by certain details which are referenced in drawings. In these drawings:

FIGS. 11-17 show three examples of the invention used for both personal identification and other applications when integrated in items such as jewelry.

DESCRIPTION OF THE PREFERRED EMBODIMENTS

Figure 1:
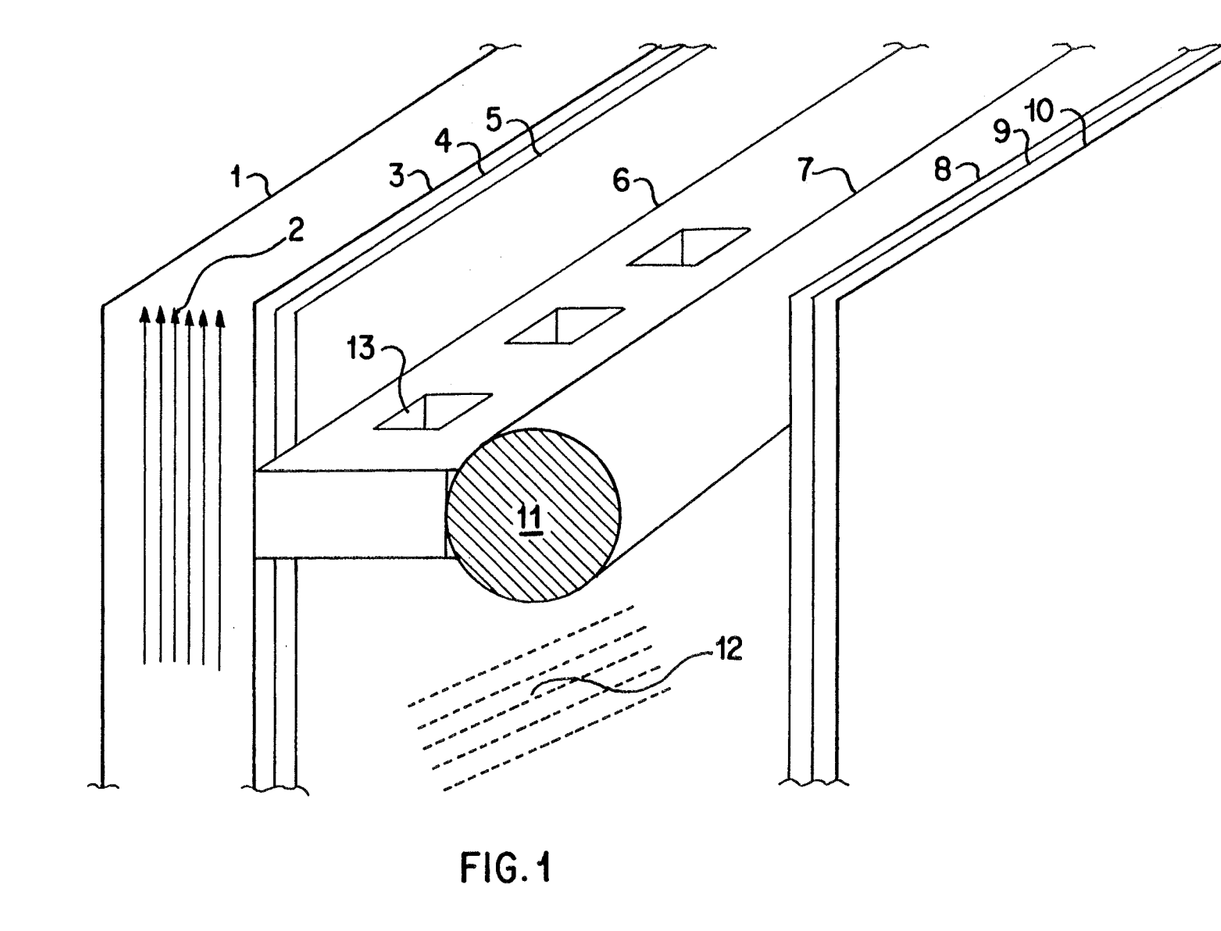
FIG. 1 shows a corner of the Programmable-Optical Composite Surface (POCS) system.

FIG. 1, which shows a corner of the Programmable Optical Composite Surface (POCS) component, is first referenced. The figure identifies single parts and groups of components used for its applications. A precooler agent 2, a type of body that is circulated between a preinsulator 1 and front surface capsule 3, is a body that has a high caloric constant, is easy to move and does not fog the transparent media. The function of precooling agent 2 is to keep front surface capsule 3 in the required temperature range for operating the POCS components such as the front surface energy collectors 4, the front surface computer matrix 5, the active optical agent 12, the rear surface computer matrix 8, the rear surface energy collectors 9, and rear surface capsule 10. A secondary cooling system is provided by high-pressure cooling agent 11 included in a microcooling tube 7, and cooling tube support 6 with flow holes 13. The main function of the secondary cooling system is to aid in cooling down the optical agent 12, so the agent can operate within its predictable characteristics.

Figure 2:
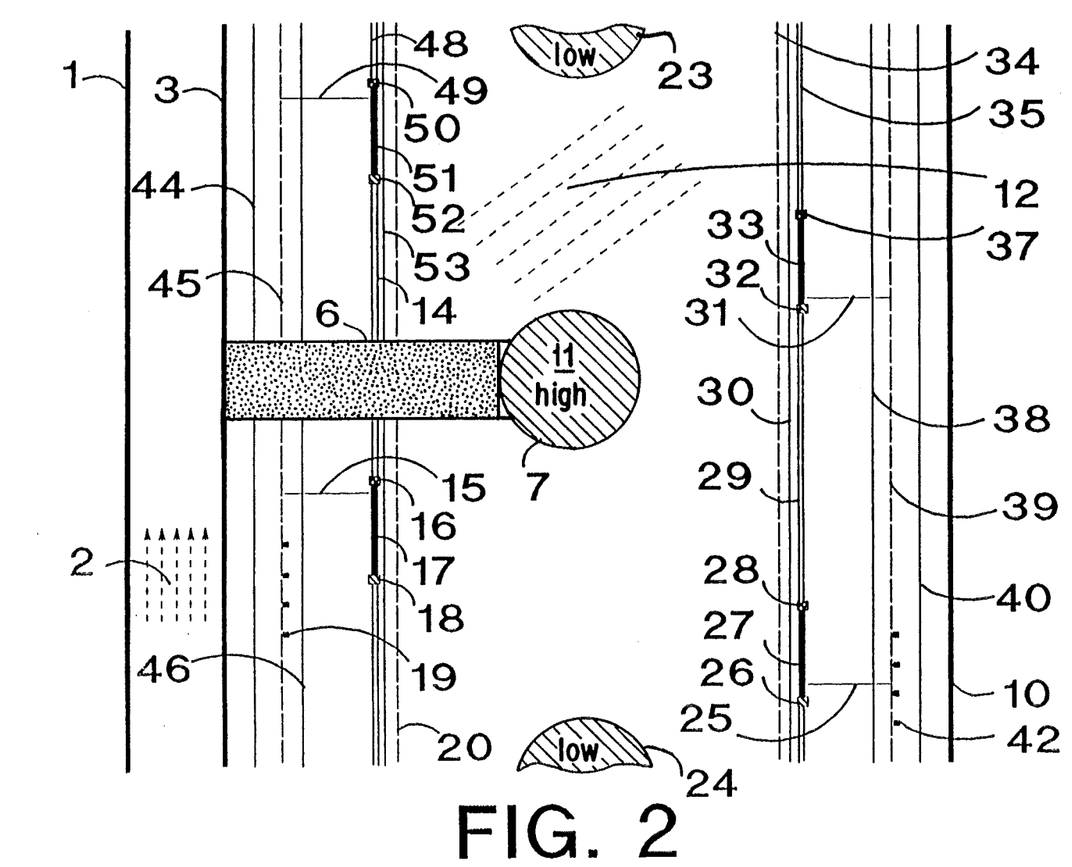
FIG. 2 provides a detailed cross-sectional view of the POCS system.

FIG. 2 is a cross-sectional view of the POCS system which shows details of the construction of the transparent, microcomputer controlled POCS domain. As shown in FIG. 1, the system may be cooled by one or more methods. One method includes preinsulator 1, precooling agent 2, and front surface capsule 3. The other, or secondary method, includes cooling tube support 6, high-pressure microcooling tube 7, low-pressure microcooling tubes 23 and 24, and high-pressure cooling agent 11. The details of operation of the primary cooling system are explained in FIG. 1, and the details of the secondary cooling system are explained in FIG. 3. The basic elements and functions of the secondary system are as follows. High-pressure cooling agent 11 can be either the optical active agent or another body. If the cooling optical agent is also the optical active agent, then the cooling agent 11 concomitantly cools the POCS cavity. Low-pressure microcooling tubes 23 and 24 operate as intakes for the heated optical agent 12 and serve as return tubes to the cooling chamber of the secondary cooling system.

If instead of using the active optical agent 12 as the cooling agent, another agent is used to cool the system, any internal break in the microcooling tube system could render the optical window inoperative due to active optical agent pollution.

The front surface transparent substrate 44, deposited on front surface capsule 3, supports the front surface energy collectors and sensors 45. In addition, the front surface X-matrix electrodes 19 are located here to aid in selecting and controlling the incoming light energy transferred to front surface computer 51 and front surface computer 17 via front surface energy connector and sensor 49 and front surface energy connector and sensor 15 respectively. Sensor data about the optical window's imagery information, environmental conditions, internal and estimated external temperatures, estimated cooling flow rates, system test quantities, system pressures, and other parameters are also transmitted from front surface energy collectors and sensors 49 and 15 to front surface computers 51 and 17 respectively for processing and storage. The front surface Y-matrix electrodes 48, separated by front surface transparent substrate and insulator 46, also aid in the selecting and controlling of incoming light energy and also provide sensory data to the front surface computers. The front surface computers obtain data about their environment and their application in a number of ways.

One way is as expressed in the above description via the front surface energy connectors and sensors. Data from the sensors are received in digital format and is "tagged" with X and Y-matrix information for pixel (re)positioning and positional information of the sensor data.

Another way is via the internal front surface computer bus 14. This bus connects all the front surface computers and is operated in the contention mode. Any computer can try to access the bus at any given time and can operate the bus as long as no other computer already has access to the bus. If a collision occurs, the contending computer will back off for a random period of time and try again, or broadcast its message optically via its optical port. No computer is allowed to control the bus for more than a predetermined period and will be timed out by any next access attempt of any other computer if this rule is violated. One of the main functions of this bus is to provide the POCS with a check of the operation of its distributed intelligence. If any computer malfunctions, other computers will take over the necessary tasks and complete them. Such an approach also increases the production yield of these systems by providing internal, redundant intelligence. Other main functions include the distribution of optical image information among the optical domains and the sharing of maintenance data which is used, for example, to regulate the cooling flow rates and the mapping of faulty computer domain components. The front surface electrodes 20 are deposited on front surface transparent substrate 53 and are connected to the domain computers via a transparent network of matrices, an electrode multiplexer interface, and an electrode multiplexer interface circuit (see FIG. 5 for a detailed description on the front and rear surface's electrodes interface). The rear surface transparent substrate 40, deposited on rear surface capsule 10, supports the rear surface energy collectors and sensors 39. In addition, the rear surface X-matrix electrodes 42 are located here to aid in selecting and controlling the incoming light energy transferred to rear surface computer 27 and rear surface computer 33 via rear surface energy connector and sensor 25, and rear surface energy connector and sensor 31 respectively. Sensor data about the optical window's exposed images, environmental conditions, internal and estimated external temperatures, estimated cooling flow rates, system test quantities, system pressures, and other parameters are also transmitted from rear surface energy collectors and sensors 25 and 31 to rear surface computers 27 and 33 respectively for processing and storage.

The rear surface Y-matrix electrodes 35, separated by rear surface transparent substrate and insulator 38, also aid in the selecting and controlling of incoming light energy and also provide sensory data to the rear surface computers. The rear surface computers obtain data about their environment and their application in a number of ways.

One way is as expressed in the above description via the rear surface energy connectors and sensors. Data from the sensors are received in digital format and are "tagged" with X and Y-matrix information for pixel (re)positioning and positional information of the sensor data.

Another way is via the internal rear surface computer bus 29. This bus connects all the rear surface computers and is operated in the contention mode. Any computer can access the bus at a given time and can operate the bus as long as no other computer already has access to the bus. If a collision occurs, the contending computer will back off a random period of time and try again, or broadcast its message optically via its optical port. No computer is allowed to control the bus for more than a predetermined period and will be timed out by any next access attempt of any other computer if this rule is violated. One of the main functions of this bus is to provide the POCS with a check of the operation of its distributed intelligence. If any computer malfunctions, other computers will take over the necessary tasks and complete them. Such an approach also increases the production yield of these systems by providing internal, redundant intelligence. Other main functions include the distribution of optical image information among the optical domains and the sharing of maintenance data which is used, for example, to regulate the cooling flow rates and the mapping of faulty computer domain components.

Figure 5:
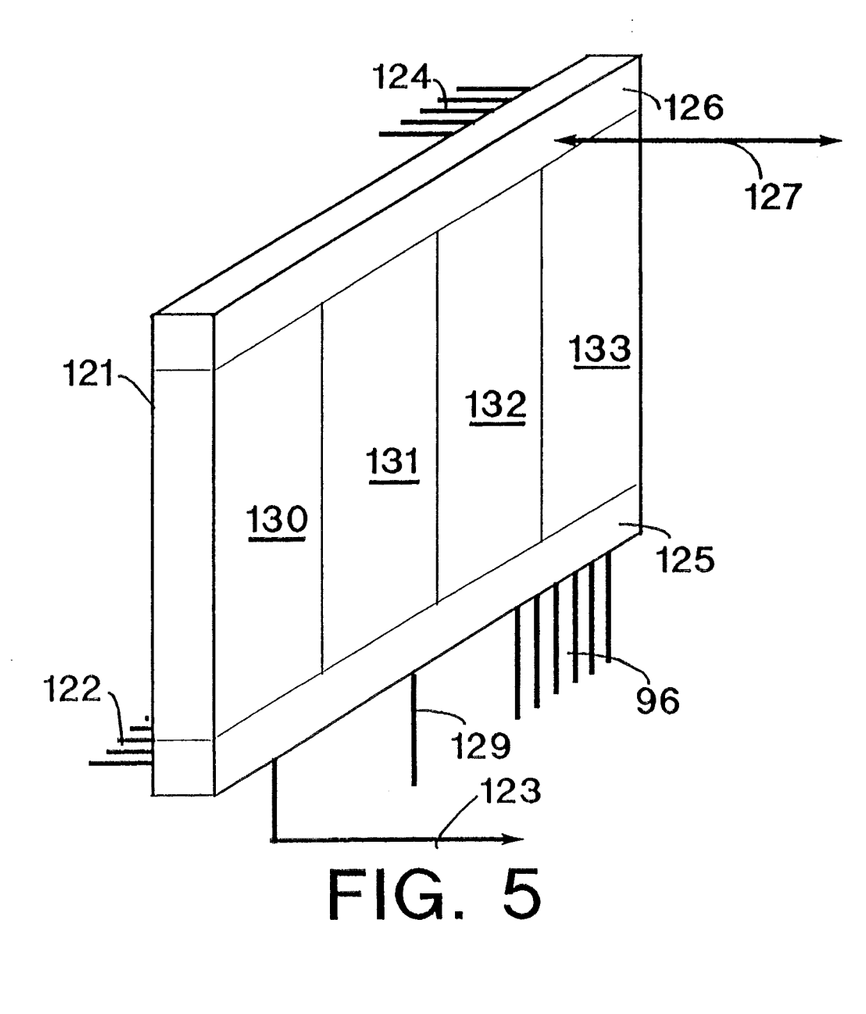
FIG. 5 shows one of the POCS energy cells and interface entities.

The rear surface electrodes 34 are deposited on rear surface transparent substrate 30 and are connected to the domain computers via a transparent network of matrices, an electrode multiplexer interface, and an electrode multiplexer interface circuit (see FIG. 5 for a detailed description on the front and rear surface's electrodes interface).

Values obtained as a result of data supplied by sensors, processing by stored programs of other internal computers, external programming computer, and internally stored programs of domain computers, are computed by the domain processors, are electrically scaled and are finally applied to the front surface electrodes. Electrode commutation is performed in concert between front and rear surface computers which, as a function of their input data, apply alternating current, or AC, commutated electrical stimulus to the front and rear surface electrodes. Operating the display in an AC mode strongly enhances the life of the optical window by reducing electrode plating. The commutation is applied in a "PUSH-PULL" manner whereby one signal on one optical agent's electrode represents the negative cycle of the AC component (or PUSH), while the PULL electrode (located geographically opposite to the previously mentioned electrode) operates in the positive cycle of the AC component. Such a design, which makes use of both front and rear surface programming of the active agent's electrodes is thought to be unique and is not found in other inventions.

Figure 3:
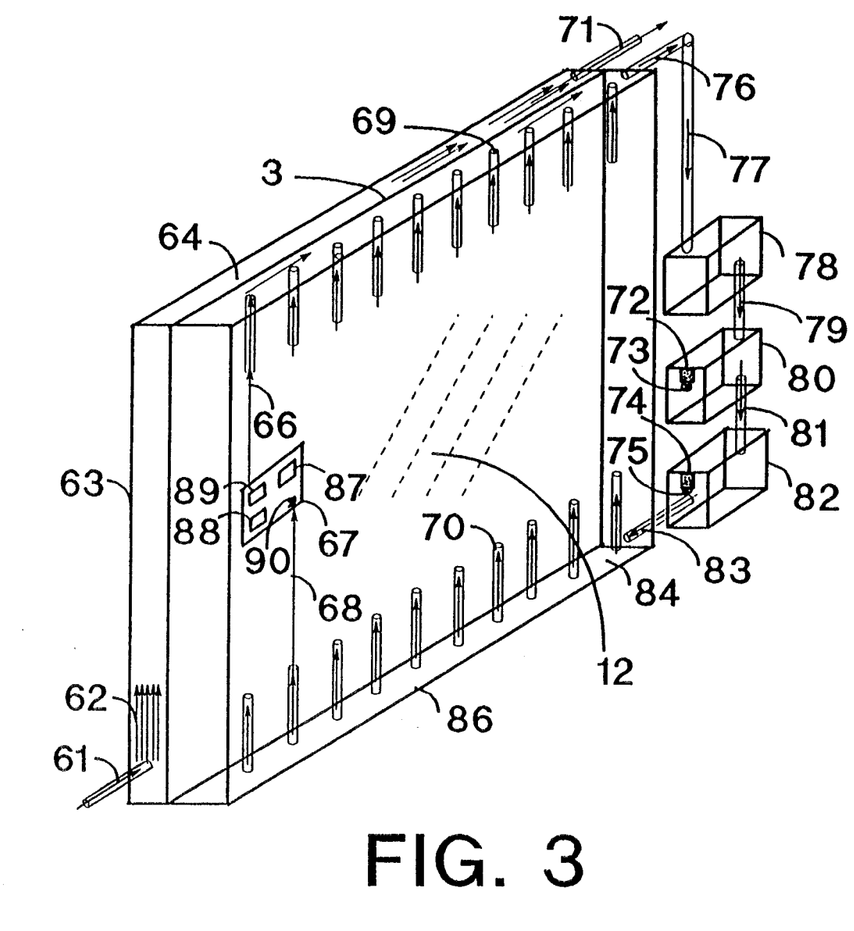
FIG. 3 provides a detailed perspective view of the POCS cooling system.

To operate the optical window, including all its components, raw power, generated by the energy collectors, is supplied to the components from the front, rear, and by connections through the seals (64 and 84 as shown in FIG. 3) from front to rear. Energy supplied by the energy collectors varies, depending on light intensity or other conditions, and must be regulated and stored in energy cells associated with each computer.

For example, the computers 51, 17, 27, 33 have therefore associated with them energy storage cells 52, 18, 26, 32, and optical I/O ports 50, 16, 28, 37, for operating the window's components. The energy cells are solid state and are designed to store and regulate the energy supplied to the POCS system's components. The I/O ports provide for optical communication between the domain computers and any other computers either internal or external, such as an external master programming computer.

FIG. 3 shows a side view of the POCS cooling system. For large surfaces, auxiliary cooling systems are recommended. In one method, a cooled gas is passed between a preinsulator and the front capsule. In a second approach, an active optical agent high pressure pump system is used to keep the domain cavity temperature within the operating range. The active optical agent is extracted at the output of the POCS system, cooled down or heated up to its operating range by any conventional method or specialty system such as the Peltier Pile-type Solid State cooling system, and is reinjected at the input of the POCS system. A second method, probably of higher cost, but more practical, uses a separate cooling agent pumped through a microcanal system within the optical window. Isolating the active optical agent from the pumping system will significantly reduce possible contamination and improve the lifetime of the POCS system. Extreme care is to be taken not to leak any of the cooling liquid into active agent canals since such mixing could cause damage. The operation of both methods is described as follows.

The cooling inlet 61 allows a cooling agent 62 to enter the cavity between the preinsulator 63 and the front surface capsule 3 and to exit at precooling outlet 71. Cooling agent outlet 76 moves the heated cooling agent to the cooling agent outlet tube 77 and from there to the heated cooling agent reservoir 78. The output from the reservoir enters via reservoir outlet tube 79, Peltier or other type cooling chamber 80 for cooling. The output from the cooling chamber enters the input of the cooling pump 82 through chamber outlet tube 81. The unheated output from the pump enters the cooling agent inlet 83 to the network of microcooling tubes 70 connected to capsule seal 84 which in turn is connected to rear capsule 86. The unheated cooling agent 68 is moved to an example computer domain 87 for cooling the computer 67, the electrode interface multiplexer 88, the energy cell and sensor interface entity 89 as well as the active optical agent 12. Heated cooling agent 66 moves from the computer domain(s) to microcooling tube 69 network back to cooling agent outlet 76 for a recycle. Peltier cooling chamber 80 and cooling pump 82 are each controlled by computers operated on optical input/output (I/O). Peltier cooling chamber 80 operates on instructions from Peltier cooling computer 72 on Peltier optical I/O 73 while cooling pump operates on instructions from cooling pump computer 74 via cooling pump optical I/O 75. Information optically transmitted by the optical window computers is received by I/O 73 and I/O 75 for lowering or raising the cooling liquid's temperature and flow rate(s). Piezoelectric valve 90, a function present in each microtube, can be operated by a domain computer to regulate the temperature of its domain environment while at the same time sending temperature and flow rate information to the optical window system including the Peltier cooling chamber 80 and cooling pump 82.

Figure 4:
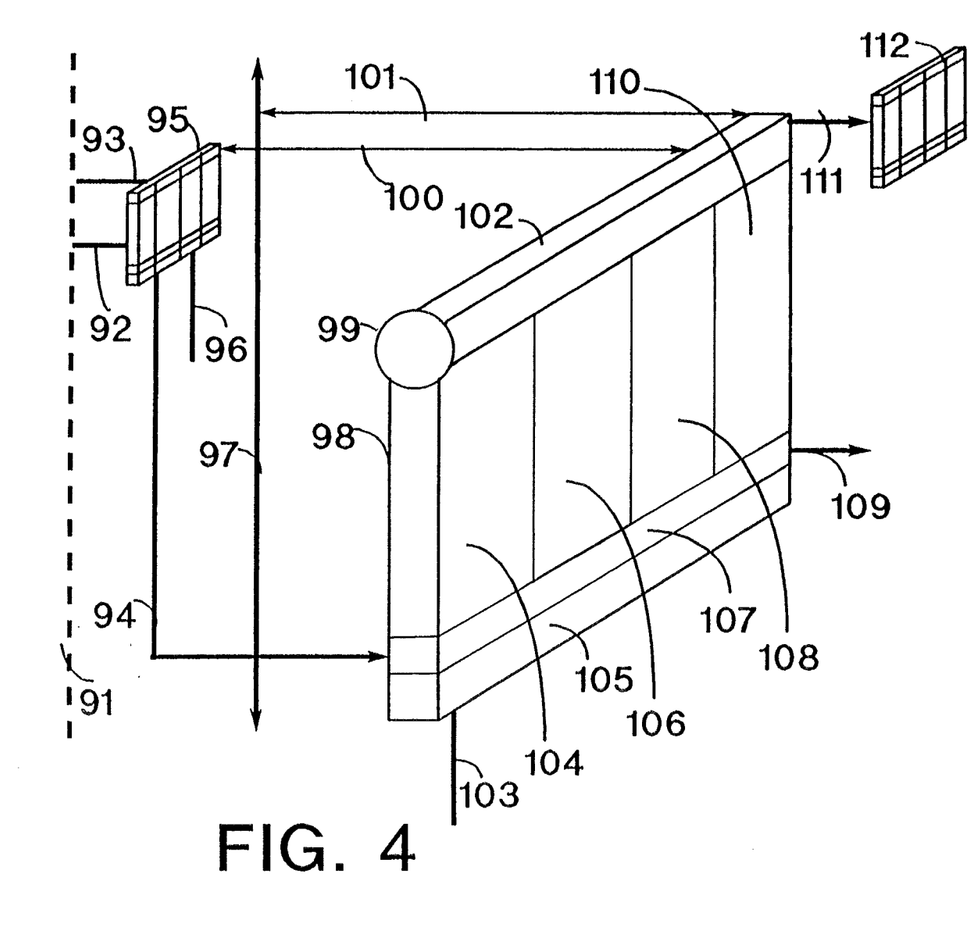
FIG. 4 represents the computer entity and its major interconnections.

FIG. 4 shows the POCS system. The energy collectors and 30 sensors 91, found on the left, supply energy and data to the computer entity 98. Energy and sensor data are fed to energy cell and sensor interface entity 95 via XY-matrix sensor inputs 93 and XY-matrix power input 92. From energy cell and sensor interface entity 95, energy power bus 94, together with system power ground matix 96, supply the raw power to the energy storage cell regulator 107 located in the computer entity 98. Sensor data about the available energy and environmental conditions of the optical window are transmitted on energy collector and sensor interface 101. The computer entity 98 contains arithmetic logic unit 104 (ALU), read only memory (ROM), secret memory 108 (SM), and nonvolatile memory 110 (NM). To provide higher voltage to the energy storage cell regulator, information from the computer entity 98 is sent back over energy connector and sensor interface 100 to the energy connector and sensor interface entity 95.

The transmitted information then causes the energy connector and sensor entity 95 to switch XY-matrix sensor inputs 93, XY-matrix power input 92, and domain system power ground bus 93 in such a way as to place more energy collectors in series to raise the input voltage. If higher current is required more energy cells are switched in parallel. Solid state energy storage cell 105 serves as a "standby cell" for power reserve and is capable to supply the domain with enough power for a predetermined period through domain voltage supplies 109. If system power is interrupted for a longer period than anticipated, solid-state energy storage cell logic provides the necessary signals to safely shut down the POCS system operation without data corruption. When power becomes again available, the energy storage cell's logic will boot the system up as required. It must be noted that some domains may shut down due to power starvation but others may not. Therefore the system exhibits "graceful degradation" thereby allowing part of the system to remain operational. Computer bus 97 allows for the computer entity to communicate with other computers and for exchanging information about performance on the current application(s). Optical input/output control 99 optically communicates with other computer entities and with the external master computer. All the communications in the computer entity are handled by input/output control 102.

Computer output to the POCS display system 112 is handled by electrode multiplexer interface 111. Each computer entity 98, which serves as a domain computer, is responsible for stimulating an assigned number of active agent electrodes. Operation of these electrodes may be accomplished with communication between front and rear surface computer entities communicating on their optical links.

FIG. 5 shows the optical window energy cell and sensor interface entity 121. The main functions of this entity are to collect and supply raw energy to the domain computers, to collect, convert, digitize, format, and transmit sensor information to the domain computers, to receive, store, and maintain digital information about image and maintenance data, and to configure the energy cell power networks via its X and Y-matrices.

The X/Y-matrix power input 122 collects energy from the optical window energy cells and routes the energy to the power output processor 125 for storage in entity energy cell 133. Processor 125 is in direct communication with the domain processor and hence instructs its internal power regulator to supply enough raw energy on raw power input 123 and via system power ground 129 and entity power ground matrix 96 for input power to the domain computer.

The X/Y-matrix sensor input 124 provide analog data to the sensor data processor 126 where sensor data is converted by entity processor 143 to digital data which is associated with X and Y positional data. The composite sensor digital data is then compressed and stored in entity memory 132. Upon communication with its domain computer, the stored information is transmitted via energy connector and sensor interface 127 for use in the residing application.

Figure 6:
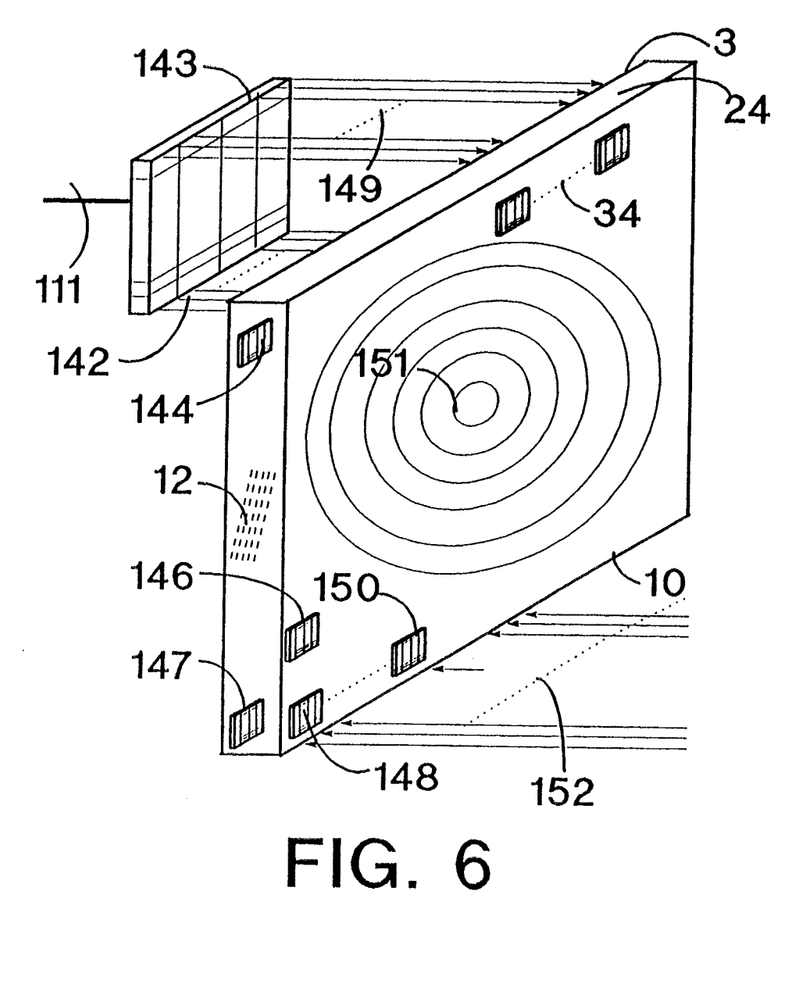
FIG. 6 provides a block-diagram view of the POCS display subsystem.

FIG. 6 depicts the POCS display subsystem. The display subsystem is interfaced to the POCS computer system via the electrode multiplexer interface 111. The electrode interface multiplexer 143 interfaces with the POCS computer system to receive image information. The information between the electrode interface multiplexer 143 and the front surface capsule 3 is transmitted on X-electrode address lines 142 and Y-electrode address lines 149. Besides carrying image information, the address lines carry positional information for display subsystem electrodes such as front surface electrode element 144 and front surface green electrode 147 as shown in the figure. Rear surface capsule be supports rear surface electrodes 34 among which are specifically shown rear surface 10 red electrode 146, rear surface green electrode 148, and rear surface blue electrode The rear electrodes are activated by rear surface electrodes X and Y address lines 152. The front capsule 3 and rear capsule sealed together by seal 24, each have matching red, green, and blue electrodes for forming color in the displayed images. In addition, the capsules support other electrodes for outlining the images in a "grey scale" manner. The POCS display subsystem shows a colored magnifying display example 151. The example consists of a set of concentric circles with well-defined borders. Each ring is of a different color. A demonstration program reduces or magnifies the colored rings via the capsule's electrodes which in turn program the optical agent 12 for the desired effects.

Figure 7A:
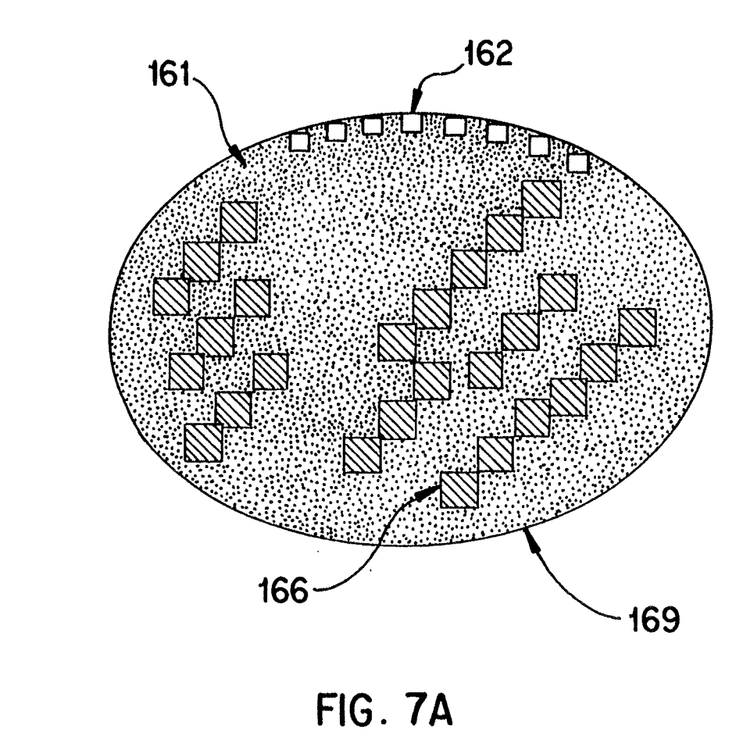
FIGS. 7A and 7B show one embodiment of the invention for a lens-type application.
Figure 7B:
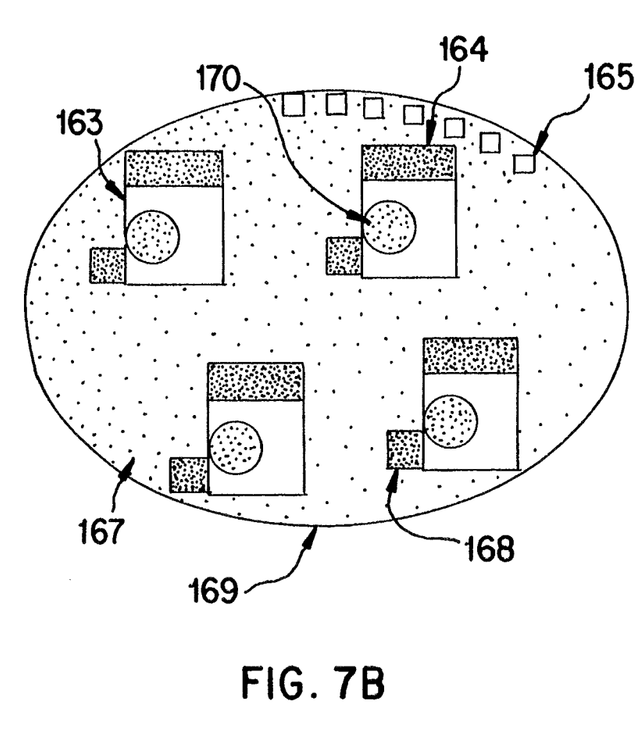

FIGS. 7A and 7B are related to the display system as shown in FIG. 6 but in this case describe an embodiment of the POCS invention in eyeglasses.

FIG. 7A, the front half of the medium, shows mostly the energy generation and collection scheme. Light energy collectors, such as solar energy electrical collector cells 166, are interconnected via X and Y solar cells collector grids 161 for producing electrical power. All the cells and the associated grids are fabricated on media substrates 169 which are transparent to the naked eye. The substrates are deposited on the front capsule which can be glass. Left media electrical contacts 162 are deposited around the edge of the front half of the medium while right media electrical contacts 165 are found on the rear half of the medium. When the front half of the medium is sealed onto the rear half of the medium, the contacts of both halves will meet for passing electrical signals such as lens operating current. After mating the halves, liquid crystal is injected within the unit's cavity. When filled, the injection opening is sealed.

FIG. 7B is the rear half of the medium. This half of the medium contains focus and transmissivity transparent, internal controller (Integrated Circuit) IC 163. IC controller 163 controls the focal length and light/dark, or transmissivity, characteristics of the medium within its X/Y liquid crystal domains and control grids 167. Other internal controllers maintain their domains and communicate with their neighbors by previously described methods through buses and optical I/O ports 170. Power received from the solar cells collector grids is received by the DC to AC converter 168 which produces all the required DC and AC voltages necessary to operate the system. The grid control lines decoder 164 provides the required electrical stimulus to the liquid crystal electrodes for operating the liquid crystal material. The unit is designed in such a manner that individual volumes of the liquid crystal material can be closely controlled thereby varying the focus of the lens in any portion of the system as required. Such a system is thought to be unique since a lens can then be programmed to operate as a variable focal length device by using the Fresnel or other methods.

Using this invention, a person's eye glass or contact lens prescription would be converted to a computer program which would contain information such as the focal profile of each eye per given distance. When this information is loaded in the lens' computers, the system would compensate for both near and farsightedness. In addition, focal length of the lens may easily be varied by outside stimulus, such as position of the eyelids, to obtain the best possible results. These stimuli are easily handled due to the processing and sensor capability of the POCS system. In addition, transmissivity and color of the lens may be set or varied as desired as a result of the stored program optically transmitted to the lens' computers via their optical I/O ports. 165 are the right media electrical contacts.

Figure 8A:
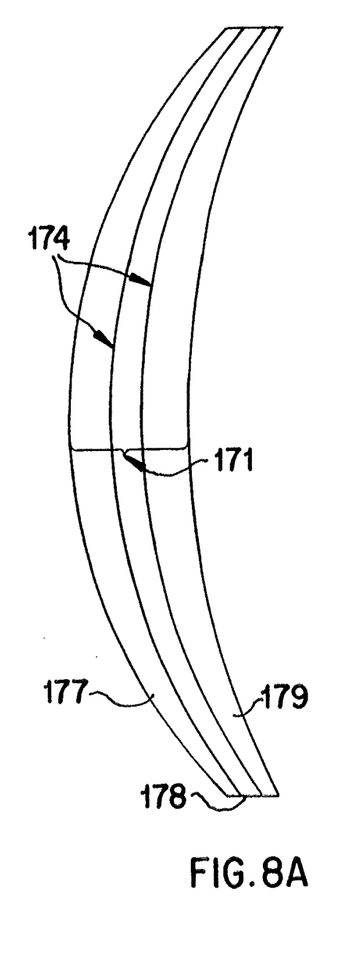
FIGS. 8A, 8B and 8C represent the invention in the form of various electronic contact lens arrangements.
Figure 8B:
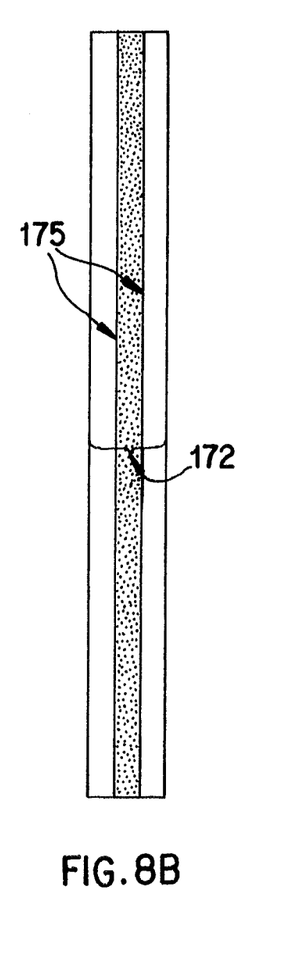
Figure 8C:
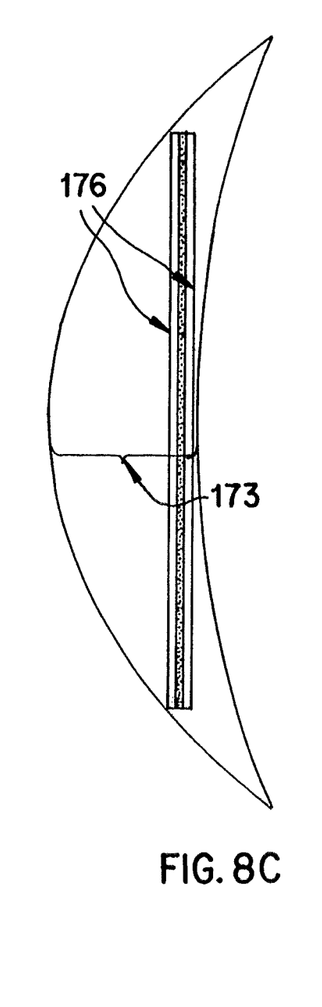

FIG. 8 shows a contact lens arrangement of the invention. The figure has three configurations. Lenses 171, 172, and include cavities 174, 175, and 176 respectively which are filled with an active optical agent, such as liquid crystal material. Contact lens 171 shows a convex/concave system including a curved cavity for the liquid crystal material. In this design the lens consists of three components—the front lens 177, the seal 178, and the rear lens 179. Circuitry is deposited on the inside of the surface areas of the cavities of configurations 171, 172, and 173. Such a design is similar to that described in FIGS. 7A and 7B. Optical window 172 is a flat lens design. Such a design is described in FIGS. 1, 2, 3, 4, and 5, although it cannot be easily worn directly on the eye, it may be inserted in the contact lens 173 and fit in the eye. This optical window lens 173 when inserted onto the eye can then programmed via an optical beam for the required characteristics such as transmissivity, color, near or farsightedness, and bi, tri, or variable-focal lengths.

Figure 9:
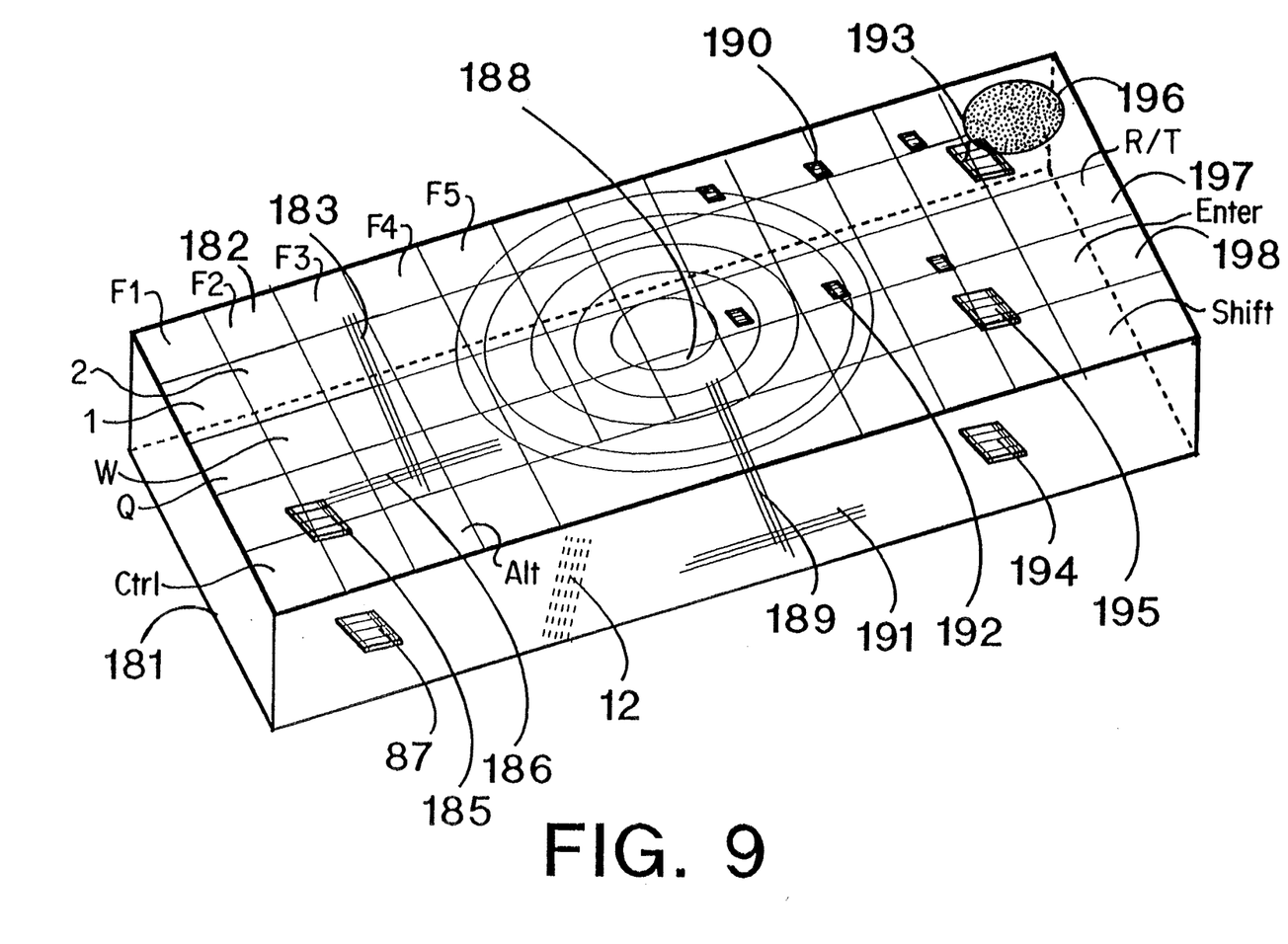
FIG. 9 represents the invention in the form of a pager and Personal Access Identification Device (PAID) or system.

FIG. 9 shows the Programmable Optical Composite Surface (POCS) Personal Access Identification Display (PAID) system 181. This system functions as a high-speed solid-state scanner for capturing, storing, transmitting, and displaying information such as written material, pictures, or other imagery. The POCS PAID system features an all electronic touch keyboard 182 for securely operating the system's functions.

In applications requiring secure turn-on, access is granted by offering a biometrics reading of the user after the user enters a PIN (Personal Identification Number), thereby enabling the device. Another method for securely turning the POCS PAID system on is to have the user place an object for scanning on the POCS PAID surface after first entering a PIN. Or, any combination of the above allows a user access to the system's operation. The keyboard features functions keys 182, "Receive" and "Transmit" key 197, the "Enter" key 198, and other keys as required.

The front Y-matrix 183, rear Y-matrix 189, front X-matrix 186, and rear X-matrix 191 connect the system's multi-unit front energy and storage cells 195 and rear energy and storage cells 194. These multi-unit cells serve to collect energy, such as light, and convert the energy to electricity. The multi-unit cells also scan, digitize, compress, and store images Lee that are sensed on its surface(s) or are received via an optical or other types of I/O system. The stored information is then forwarded to the system's multi-computer network. A POCS PAID system working in conjunction with one or more other POCS PAID systems via telephone lines, cable, or other means, can function as a teleconferencing system as an example. When operating in the wireless mode, in police cars for example, the system can quickly and securely receive imagery and other information from remote sources upon request. The system's multi-unit computer domains 87, 195 each contain a computer 193 equipped with optical 196 and other type of I/O system. Information stored by the system can be displayed (in either black and white or color) on either surface by controlling the active optical agent 12 via front electrodes 190 and rear electrodes 192 as a result of information applied by the multi-unit computers 87 and 185.

Figures 10A, 10B:
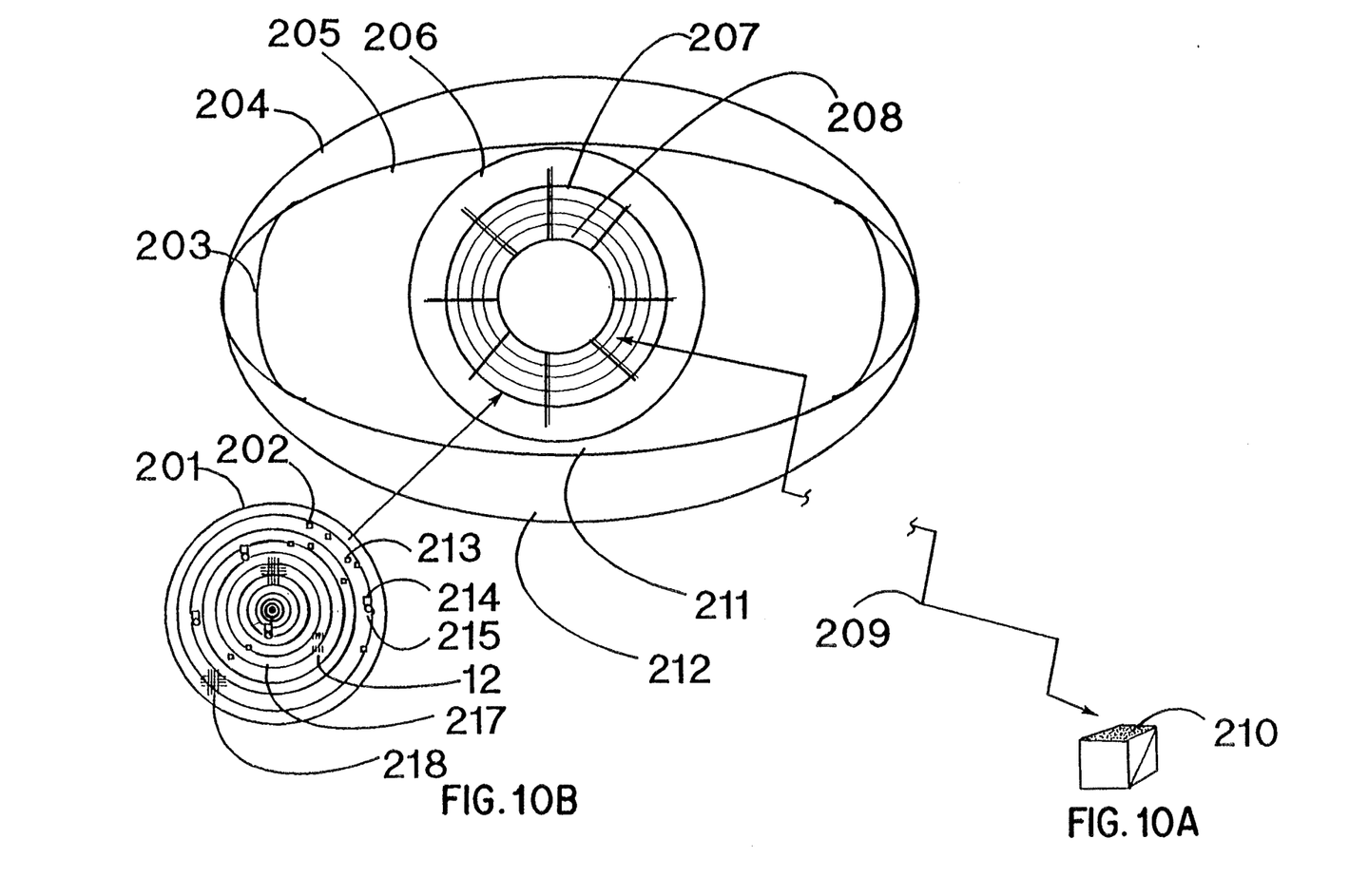
FIGS. 10A and 10B show the embodiment of the invention in an ocular lens system.

FIG. 10 shows a block diagram of the POCS ocular lens system 201 for implant in eye 203. System 201 is shown before the implant while system 207 shows the lens after the implant. Lens system 201 is a transparent flat circular POCS that is capable of varying its focal length several diopters automatically when stimulated by the required signals. The information transmitted to the lens system for focussing and other control can be supplied by a number of mechanisms. One suggested method is the moving of the eyelids 204, 205, 211, and 212, while another method may extract information from sensor beams 209 emitted by the POCS. Both methods and other means may be used simultaneously. Energy collectors and sensors near the edge of the lens relate the position of the eyelids 204, 205, 211, and 212 via the POCS X and Y matrices 218 to the domain computers, such as 214, for processing. The domain computers, such as 214, receive and share optical information obtained either from the sensors 202 or from other computers via optical I/O 215 and program active optical agent 12 via active optical agent electrodes 213 for the desired optical effects such as focus. Focus is obtained by using the Fresnel system 217 or other means for magnification. The electrical energy supplied by the energy collectors and sensors 202 supplies electrical power to the lens'system components which not only operate in the visible region, but also perform in the infrared region.

When operating in the infrared region, the energy collectors and sensors 202 convert both light and heat radiated energy to electricity while at the same time relying on locally stored energy for operation. Since available operating energy in dark environments may be small, the lens is allowed to operate in a "shutter mode" thereby supplying a "snapshot" of the viewed object such as 210, for example once every ten seconds, to conserve and recollect energy. Unlike operating in the visible region, which offers a direct translation of the viewed object 210, infrared operation allows images to be displayed on the lens' surface which may require training for correct interpretation. Nevertheless, infrared viewing is highly advantageous even in its simplest form and can aid to better perception of the environment when used by itself or when combined with imagery information supplied from the visible region. Such a system, capable of operating both in the visible and infrared region by relying on the multi-unit transparent computer domain operation for multi-processing and optical I/O interfaces, is thought to be unique.

Lens system 207 is located in the eye 203 behind the iris 206 supported by the eye's suspensory ligaments after removal of the defective eye lens. Light, or heat energy, enters the lens through pupil 208. The received input energy supplies the lens' operating power, while at the same time the intensity of the supplied energy controls the lens' transmissivity, much like "light dimming" or reduction of input light.

Lens system 207 can be constructed to contain several staged lenses since each lens is relatively thin. For example, it is estimated that three or more lenses may be staged to a composite thickness of 0.254 centimeters or less since each lens may be in the order of 0.0254 centimeters thick at a 1 centimeter diameter. Such lens size estimates are presented for example only. Much larger or smaller lenses are also possible. The advantages of such a composite lens system include telescopic vision, high "bright to dim" control, and better focusing. This POCS system can be manufactured and custom programmed to selectively project the image onto an undamaged portion of the eye's retina.

Figure 11:
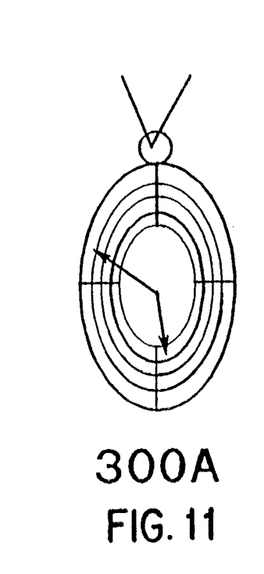
Figure 12:
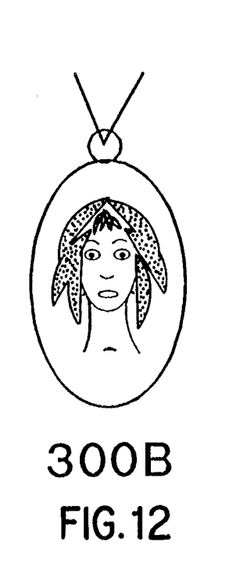
Figure 13:
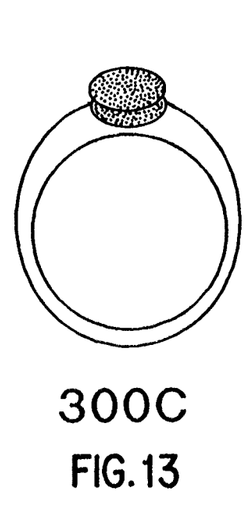
Figure 14:
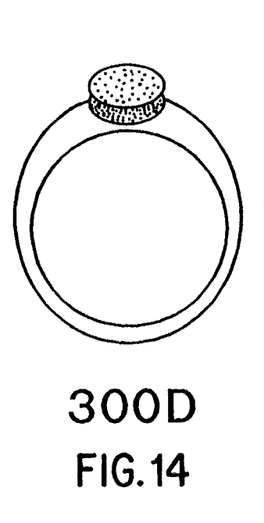
Figure 15:
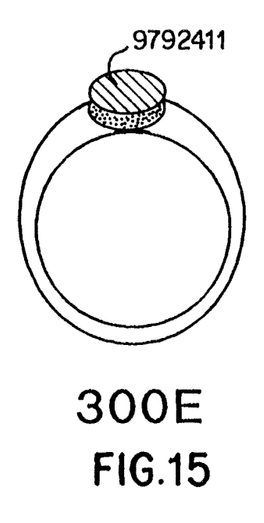
Figure 16:
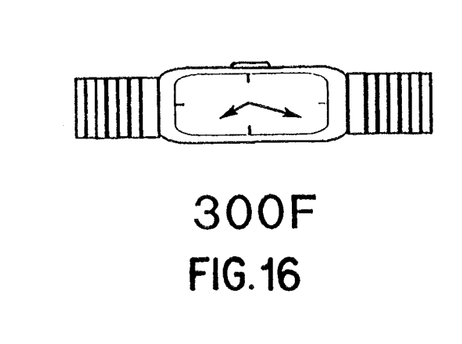
Figure 17:
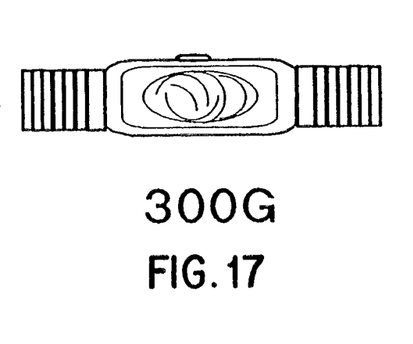

FIG. 11 shows three arrangements of the POCS used as a jewelry device that is programmed for a number of applications such as time, information, identification, or to metamorphose its appearance. Pictures FIG. 300A and FIG. 300B represent a POCS pendant worn as jewelry. In FIG. 300A, the pendant provides time while in FIG. 300B the owner's picture is presented when the pendant is touched in a certain manner. Pictures FIG. 300C, FIG. 300D, and FIG. 300E represent a POCS ring which can optically be programmed with the appearance of several different gem stones or can be used as an identification device when touched or optically stimulated in a certain manner. Pictures FIG. 300F and FIG. 300G represent a POCS bracelet watch. In its normal mode, this POCS instrument appears as a normal liquid crystal watch. The programmable optical composite surface has sensitive areas to touch for changing its operation. To enter a particular application, the user presents information to the face of the watch. When a match occurs, a touch keyboard is presented to the user for selecting menus and operations of the instrument.

It will be apparent that many modifications and variations may be affected without departing from the scope of the novel concepts of this invention.

What is claimed is:

1. An electromagnetic radiation control device comprising:

a front transparent planar capsule provided with a plurality of planar surfaces;

a rear transparent planar capsule sealingly engaged to said front planar capsule to provide an enclosed volume therebetween said rear capsule provided with a plurality of planar surfaces;

a transparent electro-optical agent provided within said enclosed volume;

a transparent energy collection device provided on at least one of said planar surfaces of said front and rear capsules;

a transparent sensor device provided on at least one of said planar surfaces of said front and rear capsules for receiving electro-optical information from an external object;

at least one transparent re-programmable solid state memory and control device provided on at least one of said transparent planar surfaces of said front and rear capsules for receiving information from said transparent sensor device and for the control of the characteristics of said transparent electro-optical agent based upon said information from said sensor device and material provided within said transparent memory, said transparent memory and transparent control device powered by said energy collection device said transparent memory and control device projecting images onto one of said planar surfaces based upon information included in said transparent memory and control device as well as information provided to said transparent memory and control device from said transparent sensor device, said transparent memory and control device and said transparent sensor device scanning, detecting, measuring, storing, computing and printing information based upon information provided in said transparent memory and control device and sensed by said transparent sensor device; and a transparent electrode matrix provided on at least one of said planar surfaces of said front and rear capsules for connecting said transparent energy collection device and said transparent sensor device to said transparent memory and transparent control devices and for connecting said transparent memory to said transparent electro-optical agent to control the characteristics thereof.

2. The control device in accordance with claim 1, further including a plurality of interconnectable transparent memory and transparent control devices.

3. The control device in accordance with claim 1, wherein said transparent memory and transparent control devices are transparent to the naked eye.

4. The control device in accordance with claim 2, wherein said plurality of transparent memory and transparent control devices are connected to each other by one or more transparent internal buses.

5. The control device in accordance with claim 1, wherein said transparent memory and transparent control devices are electro-optically internally and externally re-programmable.

6. The control device in accordance with claim 5, wherein said memory and control devices are electro-optically internally and externally re-programmable.

7. The control device in accordance with claim 1, wherein said enclosed volume is provided with a plurality of segmented enclosed sections, each section provided with said electro-optical agent therein, the characteristics of said electro-optical agent in each of said enclosed sections controlled by said memory and transparent control devices.

8. The electromagnetic radiation control device in accordance with claim 1, further including a transparent coolant provided within said front and rear transparent capsules.

9. The electromagnetic control device in accordance with claim 1, wherein both said front transparent planar capsule and said rear transparent planar capsule are flat for their entire area.

* * * * *